US 6,582,034 B2

(12) United States Patent
Hara et al.

(10) Patent No.: US 6,582,034 B2
(45) Date of Patent: Jun. 24, 2003

(54) VEHICULAR BRAKE CONTROL METHOD AND APPARATUS

(75) Inventors: Kouichi Hara, Susono (JP); Shoji Inagaki, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/916,283

(22) Filed: Jul. 30, 2001

(65) Prior Publication Data

US 2002/0021044 A1 Feb. 21, 2002

(30) Foreign Application Priority Data

Aug. 4, 2000 (JP) ........................................ 2000-237456

(51) Int. Cl.7 ................................................. B60T 8/66
(52) U.S. Cl. ......................... 303/157; 303/11; 303/156; 303/158
(58) Field of Search ................................ 303/3, 10, 11, 303/15, 16, 122.09, 125, 155, 156, 157, 158, 193, 113.1, 116.1, 116.2

(56) References Cited

U.S. PATENT DOCUMENTS

| | | | | |
|---|---|---|---|---|
| 4,666,218 A | * | 5/1987 | Masaki et al. ............... 303/150 |
| 4,753,131 A | | 6/1988 | Wupper |
| 5,281,011 A | * | 1/1994 | Yoshino et al. ........... 303/113.4 |
| 5,358,320 A | * | 10/1994 | Fuchida ..................... 303/116.1 |
| 5,509,729 A | * | 4/1996 | Zaviska et al. ........... 303/115.4 |
| 5,584,543 A | * | 12/1996 | Sawada ....................... 303/156 |
| 5,609,401 A | * | 3/1997 | Johnston et al. ......... 303/113.4 |
| 5,657,229 A | * | 8/1997 | Naito et al. ............. 188/DIG. 1 |
| 5,683,149 A | * | 11/1997 | Aizawa et al. ................. 303/10 |
| 5,725,286 A | * | 3/1998 | Sekiguchi ................. 303/115.4 |
| 5,735,582 A | * | 4/1998 | Eith et al. ............... 137/596.17 |
| 5,806,010 A | * | 9/1998 | Sawada ........................ 303/10 |
| 5,865,213 A | * | 2/1999 | Scheffel et al. ......... 137/596.17 |
| 6,003,957 A | * | 12/1999 | Toda et al. .................... 303/10 |
| 6,056,373 A | * | 5/2000 | Zechmann et al. .......... 188/353 |
| 6,132,012 A | * | 10/2000 | Ishii ....................... 303/122.09 |
| 6,231,131 B1 | * | 5/2001 | Dinkel et al. ............. 303/113.2 |
| 6,241,323 B1 | * | 6/2001 | Wagner et al. ........... 303/113.4 |
| 6,273,525 B1 | * | 8/2001 | Erban et al. ..................... 303/11 |
| 6,285,944 B1 | * | 9/2001 | Tange et al. ................. 180/167 |

FOREIGN PATENT DOCUMENTS

| | | |
|---|---|---|
| JP | 10-508561 | 8/1998 |
| JP | 11-321619 | 11/1999 |

* cited by examiner

Primary Examiner—Cristopher P. Schwartz
Assistant Examiner—Devon Kramer
(74) Attorney, Agent, or Firm—Oliff & Berridge, PLC

(57) ABSTRACT

A vehicular brake control method and apparatus having a controller that controls a pressure of a supplied operating fluid to the wheels. The vehicle brake control apparatus includes brakes that apply braking forces corresponding to the pressure of the operating fluid to the wheels. A pump is provided that force-feeds the operating fluid. A valve is disposed to adjust the pressure of the operating fluid that is force-fed from the pump. The controller performs an operation control of the pump and the valve to control the pressure of the operating fluid to be supplied to the brakes when the controller determines that the braking forces are to be applied to the vehicle. The controller controls a pressure-increasing gradient of a fluid pressure by controlling both the pump and the valve during a pressure-increasing control for increasing the pressure in the brakes.

21 Claims, 12 Drawing Sheets

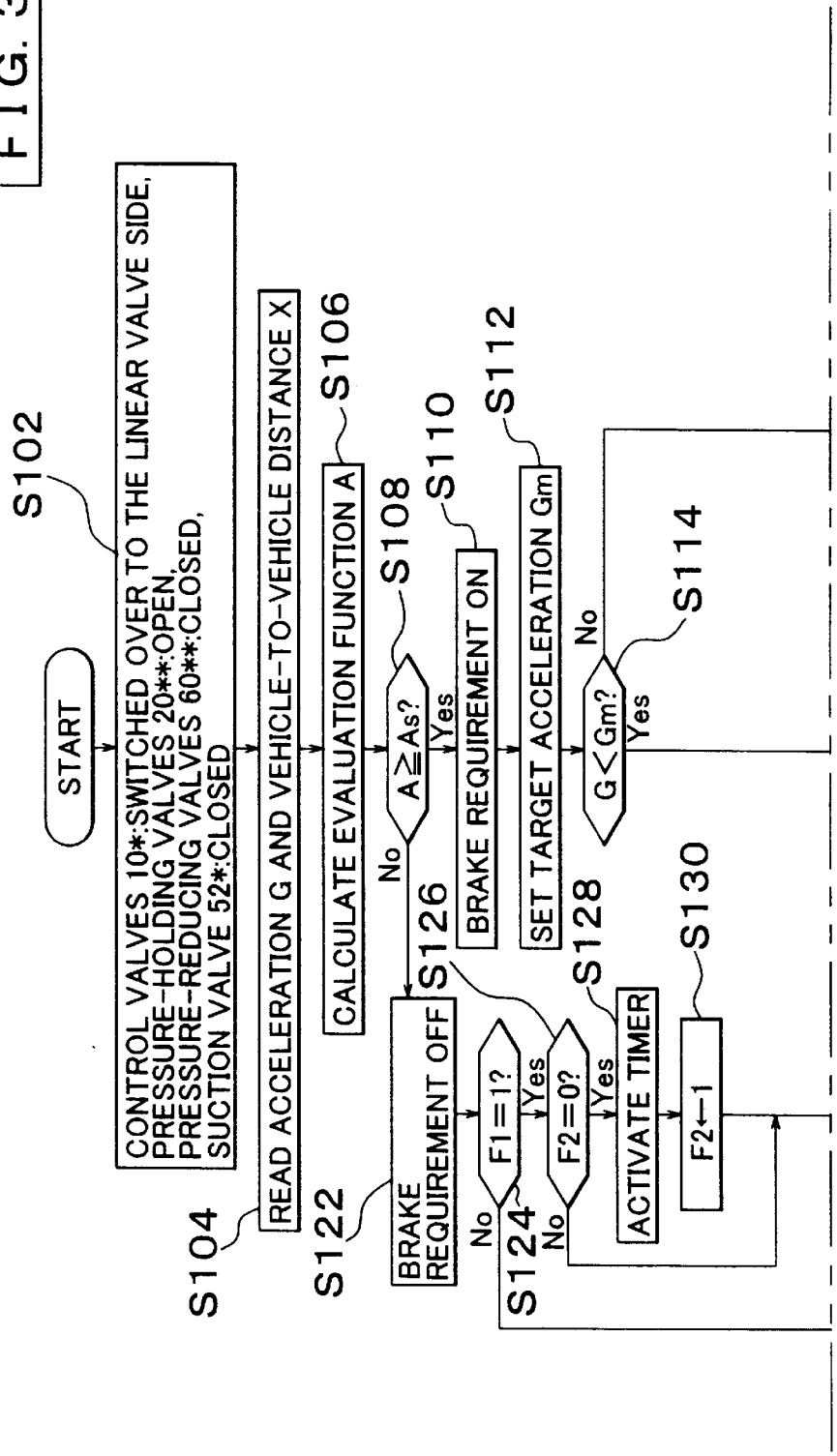

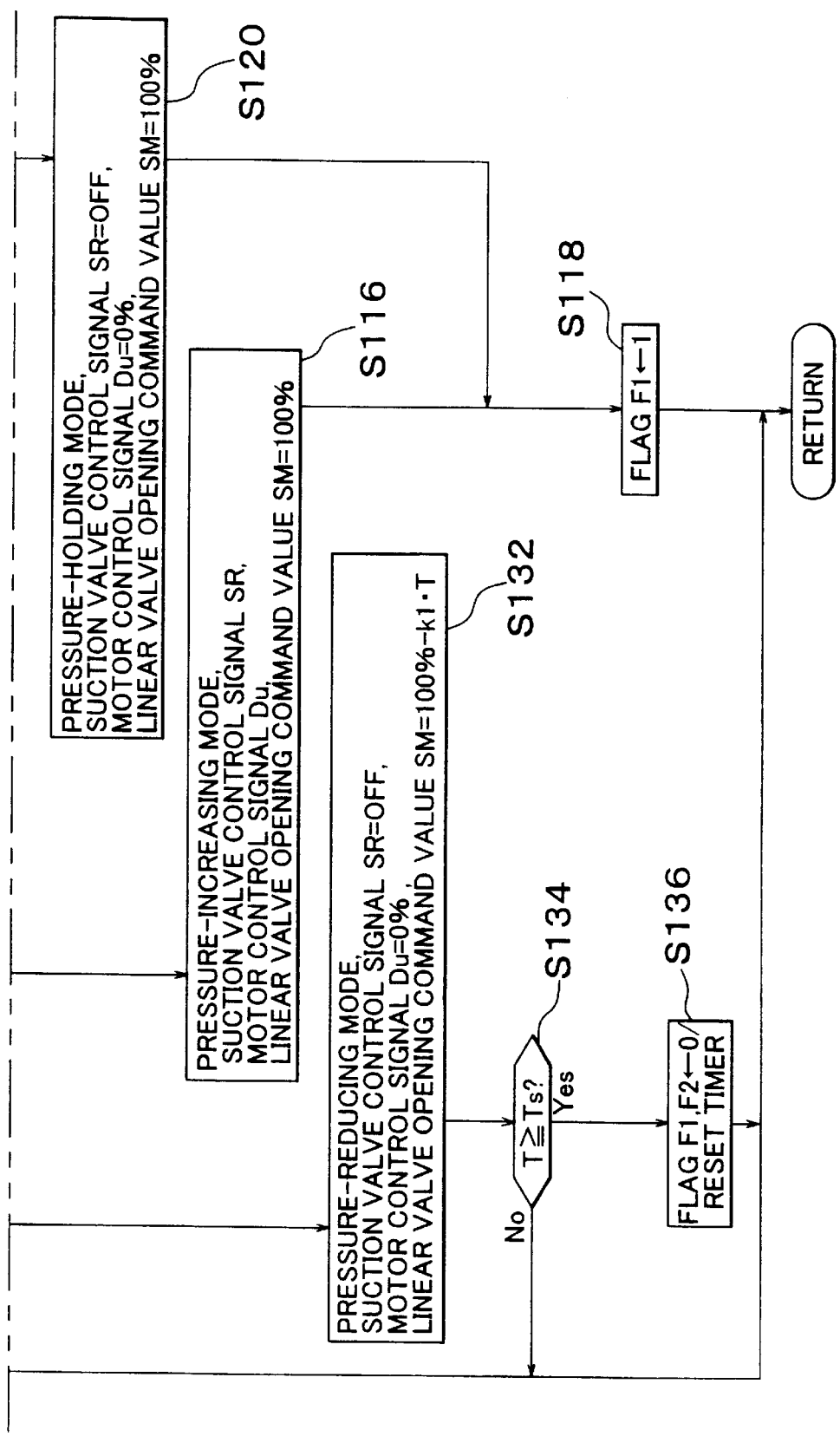

| FIG. 8A |
| FIG. 8B |

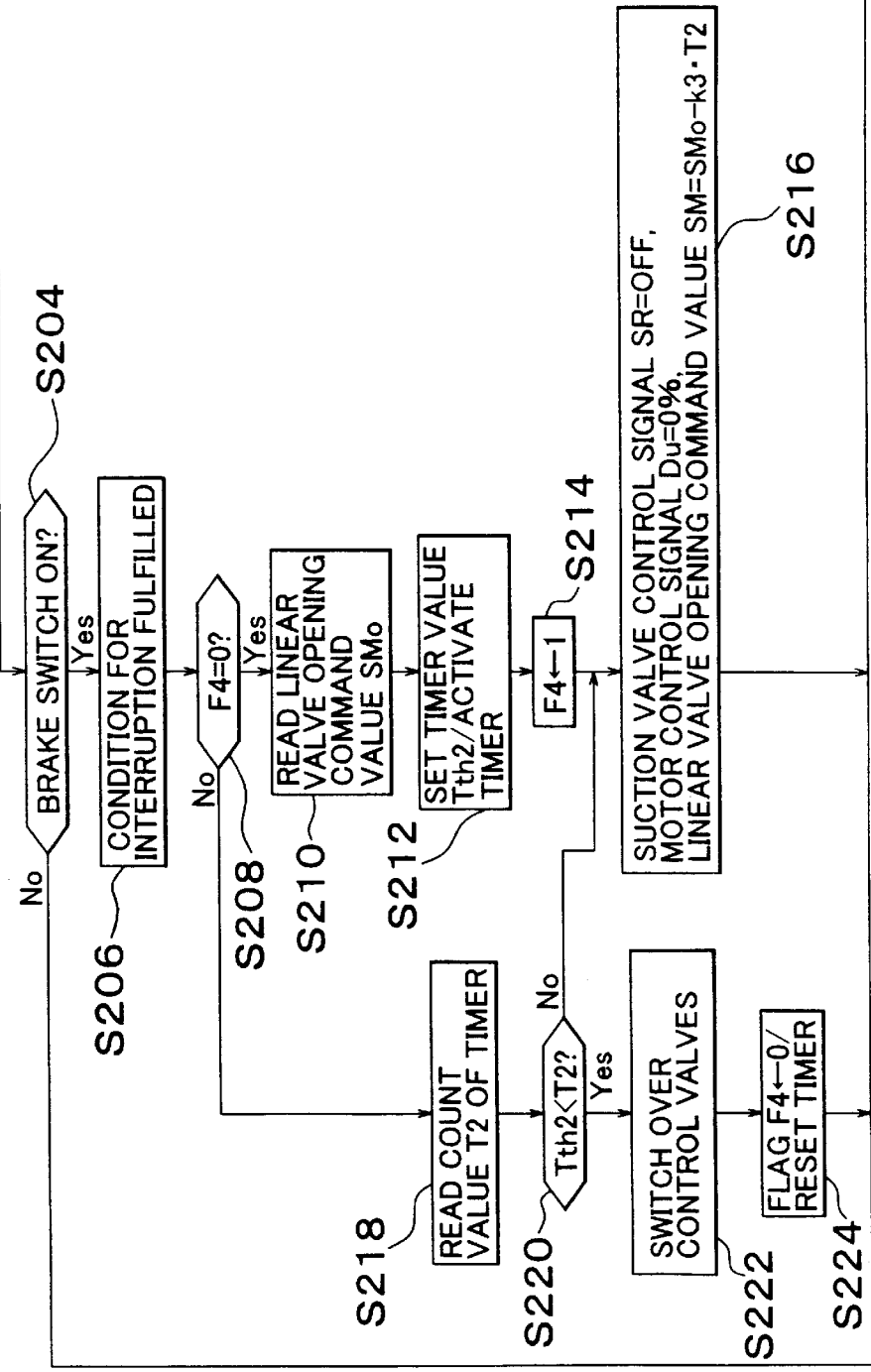

VEHICULAR BRAKE CONTROL METHOD AND APPARATUS

INCORPORATION BY REFERENCE

The disclosure of Japanese Patent Application No. 2000-237456 filed on Aug. 4, 2000 including the specification, drawings and abstract is incorporated herein by reference in its entirety.

BACKGROUND OF THE INVENTION

1. Field of Invention

The invention relates to a brake control apparatus and a brake control method for a vehicle wherein braking forces are applied to wheels automatically by controlling a pressure of operating fluid in addition to braking operation by a driver.

2. Description of Related Art

As disclosed in Japanese Patent Application Laid-Open No. 11-321619, a brake control apparatus applies braking forces automatically under a predetermined condition in addition to a braking operation by a driver. Such a brake control apparatus is usually provided with a fluid pressure actuator capable of controlling a pressure of operating fluid supplied to wheel cylinders in addition to the braking operation by a driver. By performing operation control of the fluid pressure actuator, desired braking forces are generated. Such a fluid pressure actuator is for example composed of a pump that force-feeds operating fluid and a control valve that switches over oil passages or controls a flow rate of the operating fluid.

In this manner, the fluid pressure actuator controls braking forces automatically using the pump for force-feeding operating fluid as a fluid pressure source. In the case where a malfunction occurs, in the fluid pressure actuator including the pump and the control valve, a time period of ten seconds to 100 seconds is required to electrically detect the malfunction. Meanwhile, the pressure of the operating fluid supplied to the wheel cylinders may rise unnecessarily.

SUMMARY OF THE INVENTION

To solve such a problem, the invention provides a vehicular brake control apparatus capable of preventing an unnecessary rise in the pressure of the operating fluid supplied to the wheel cylinders where a malfunction occurs in a fluid pressure actuator during automatic control of the braking forces.

A vehicular brake control apparatus according to a first aspect of the invention comprises brakes that apply braking forces corresponding to a pressure of supplied operating fluid to wheels, a pump that force-feeds operating fluid, a valve that adjusts a pressure of operating fluid force-fed from the pump, and a controller. The controller performs operation control of the pump and the valve and controls a pressure of the operating fluid to be supplied to the brakes. The controller also controls a pressure-increasing gradient of the fluid pressure by controlling both the pump and the valve during pressure-increasing control for increasing the fluid pressure in the brakes.

Thus, even if a malfunction occurs in one of the pump and the valve, the other functions normally. Therefore, an unnecessary rise in the fluid pressure in the brakes can be prevented.

Further, the valve may be connected to a suction port of the pump to control an opening state of communication of an operating fluid passage.

The amount of flow of operating fluid sucked by the pump via the operating fluid passage as a circulating passage is controlled by the valve. Thus, even in the case where a malfunction that could lead to an increase in discharge amount occurs in the pump, since the suction amount is limited, an increase in discharge amount can be prevented. Further, even if the control valves have been closed completely due to a malfunction, since the pump is drivingly controlled normally, an unnecessary rise in the fluid pressure in the brakes can be prevented.

Further, during pressure-increasing control, the pump may be duty-driven, and the opening and closing of the valve may also be duty-driven.

A vehicular brake control apparatus according to a second aspect of the invention comprises a master cylinder that changes a pressure of operating fluid in accordance with a brake operating force, brakes that apply braking forces corresponding to a pressure of operating fluid supplied from the master cylinder to the wheels, a pump that force-feeds operating fluid, control valves that are provided in communication passages between the master cylinder and the brakes and that control an opening state of the communication passage. An introduction passage is provided for introducing operating fluid that has been force-fed from the pump to the communication passages between the control valves and the brakes, and a controller performs operation control of the pump and the control valves and controls a pressure of operating fluid to be supplied to the brakes. The controller closes the control valves and stops operation of the pump during pressure-holding control for holding fluid pressure in the brakes.

According to the second aspect, during pressure-holding control (constant-pressure control) for holding fluid pressure in the brakes, the control valves are closed, whereby the communication passages between the master cylinder and the brakes are shut off. The operating fluid that has been delivered from the pump is encapsulated between the pump and the brakes. A stopped state of the pump is maintained during pressure-holding control. Thus, in comparison with the case where fluid pressure paths are switched over with the pump being driven so that the fluid pressure applied to the brakes is held, an unnecessary rise in the fluid pressure in the brakes can be reliably prevented because the pump is out of operation during pressure-holding control.

Further, a vehicular brake control apparatus according to a third aspect of the invention comprises a master cylinder that changes a pressure of operating fluid in accordance with a brake operating force, brakes that apply braking forces corresponding to a pressure of operating fluid supplied from the master cylinder to wheels, a pump that force-feeds operating fluid, control valves are provided in communication passages between the master cylinder and the brakes and control an opening state of the communication passages. An introduction passage is disposed for introducing operating fluid that has been force-fed from the pump into the communication passages between the control valves and the brakes, and a controller performs operation control of the pump and the control valves and controls a pressure of operating fluid to be supplied to the brakes. The controller opens the control valves and stops operation of the pump during pressure-reducing control for reducing fluid pressures in the brakes.

According to the third aspect, the control valves are opened during pressure-reducing control for reducing fluid pressure in the brakes, whereby the operating fluid encapsulated between the pump and the brakes flows toward the master cylinder. While the control valves are open, a stopped state of the pump is maintained. Thus, in comparison with the case where fluid pressure applied to the brakes is reduced by performing operation control of the pump, an unnecessary rise in fluid pressure in the brakes can be reliably prevented because the pump is out of operation.

The aspects of the invention should not be limited to the vehicular brake control apparatuses as described above. For example, other aspects of the invention include a vehicle equipped with a vehicular brake control apparatus and a method of controlling a vehicular brake control apparatus.

BRIEF DESCRIPTION OF THE DRAWINGS

FIGS. 3A and 3B are a flowchart illustrating vehicle-to-vehicle distance control performed by the brake unit.

FIGS. 8A and 8B are a flowchart illustrating a process of terminating brake control shown in FIGS. 3A and 3BA and 3B if braking operation has been performed by a driver.

FIG. 9 illustrates how various signals, wheel cylinder pressures, a master cylinder pressure, and so on change with time in the case where termination control shown in FIGS. 8A and 8B has been performed and where the hydraulic pressure detected by a master pressure sensor does not rise sufficiently even when a brake switch has been turned on.

DETAILED DESCRIPTION OF PREFERRED EMBODIMENTS

Hereinafter, embodiments of the invention will be described with reference to the accompanying drawings.

First of all, the first embodiment of the invention will be described.

Figure 1:
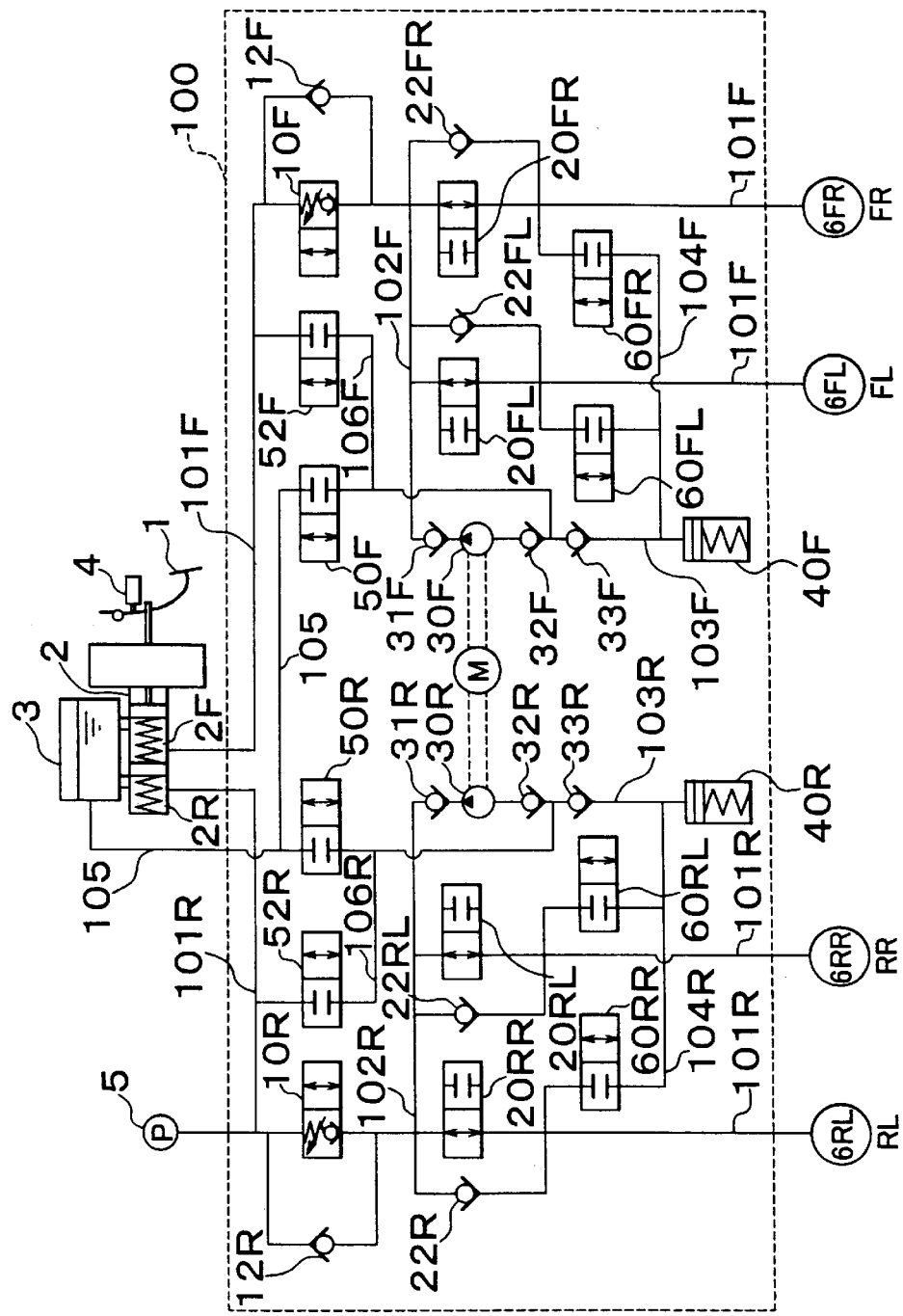
FIG. 1 is a block diagram schematically showing an overall construction of a brake unit.

FIG. 1 schematically shows an overall construction of a brake unit. In response to a depressing operation of a brake pedal 1, hydraulic pressures are generated in two separate pressure chambers 2F, 2R of a master cylinder 2. A reservoir 3 is connected to the pressure chambers 2F, 2R of the master cylinder 2. A state of communication between the pressure chambers 2F, 2R and the reservoir 3 changes depending on the position of a piston in the master cylinder 2.

The pressure chamber 2F of the master cylinder 2 is connected to wheel cylinders 6FL, 6FR constituting a brake mechanism for front-left and front-right wheels via a later-described brake actuator 100. The pressure chamber 2R of the master cylinder 2 is connected to wheel cylinders 6RL, 6RR constituting a brake mechanism for rear-left and rear-right wheels also via the brake actuator 100.

The construction of the brake actuator 100 will now be described.

A control valve 10F is provided in a pipe conduit 101F that constitutes a hydraulic system on the side of front wheels FR, FL and that connects the pressure chamber 2F to the wheel cylinders 6FL, 6FR. The control valve 10F has a linear valve port and a communication port. The linear valve port is provided with a linear valve mechanism capable of linearly controlling a hydraulic pressure by preventing pressure oil from flowing from the pressure chamber 2F toward the wheel cylinders 6FL, 6FR and adjusting flow of pressure oil from the wheel cylinders 6FL, 6FR toward the pressure chamber 2F. The control valve 10F is in communication with the pipe conduit 101F via the communication port. A control valve 10R is in communication with a pipe conduit 101R via the communication port. The linear valve port and the communication port can be switched over by a command from a control unit 200. A check valve 12F that allows pressure oil to flow toward the wheel cylinders 6FL, 6FR and that prevents pressure oil from flowing toward the pressure chamber 2F is provided in parallel with the control valve 10F.

Pressure-holding valves 20FR, 20FL that can encapsulate pressure oil on the side of the wheel cylinders 6FL, 6FR when being closed are provided in the conduit 101F between the control valve 10F and the wheel cylinders 6FL, 6FR respectively. Check valves 22FR, 22FL that prevent pressure oil from flowing toward the wheel cylinders 6FL, 6FR are provided in parallel with the pressure-holding valves 20FR, 20FL respectively.

A fluid pressure pump 30F that is rotationally driven by a motor M functions as a fluid pressure source in automatically controlling a braking force. A discharge port of the fluid pressure pump 30F is connected to the conduit 101F between the control valve 10F and the wheel cylinders 6FL, 6FR via an introduction duct 102F. Because of this pipe arrangement, the pressure oil that has been force-fed by the fluid pressure pump 30F can be supplied to the wheel cylinders 6FL, 6FR via the introduction ducts 102F, 101F respectively.

The fluid pressure pump 30F is connected on the side of its suction port to an accumulator 40F via a pipe conduit 103F. Check valves 32F, 33F that prevent pressure oil from flowing in a counter-suction direction are disposed in the pipe conduit 103F. A check valve 31F that prevents pressure oil from flowing in a counter-discharge direction is provided in an introduction pipe conduit 102F connected to a discharge port of the fluid pressure pump 30F.

The pipe conduit 103F between the check valves 32F, 33F is connected to the reservoir 3 via a suction pipe conduit 105. The suction pipe conduit 105 extends across a suction valve 50F capable of changing a state of communication of the suction pipe conduit 105. The suction valve 50F is constructed of an open-close valve that is opened and closed in response to an ON-OFF signal. By controlling the duty ratio of a control signal as the ON-OFF signal, the suction valve 50F is duty-driven in such a manner as to be opened and closed at intervals of a predetermined period.

Further, the pipe conduit 101F and the suction pipe conduit 105 are connected by a pipe conduit 106F. The pipe conduit 106F is provided with a suction valve 52F that controls a state of predetermined oil that has been sucked from the pipe conduit 101F as a normal brake line.

The pipe conduit 101F between the pressure-holding valves 20FR, 20FL and the wheel cylinders 6FL, 6FR and the accumulator 40F are connected by a pressure-reducing pipe conduit 104F. The pressure-reducing pipe conduit 104F is provided with pressure-reducing valves 60FR, 60FL that can reduce pressure in the wheel cylinders 6FL, 6FR by switching over the pressure-reducing pipe conduit 104F between its communication state and its shut-off state.

Further, a hydraulic system that is on the side of the rear wheels RR, RL and that is between the pressure chamber 2R and the wheel cylinders 6RL, 6RR is constructed in the same manner as the hydraulic system on the side of the front wheels FR, FL. Referring to FIG. 1, reference symbols "F" annexed to the components on the side of the front wheels FR, FL are replaced by "R", whereby corresponding components of the hydraulic system on the side of the rear wheels RR, RL are denoted. The description thereof will be omitted.

The brake pedal 1 has a brake switch 4 that detects that the brake pedal 1 has been depressed to a predetermined position. Further, the pipe conduit 101R is provided with a master pressure sensor 5 that detects a hydraulic pressure generated in the master cylinder 2.

Figure 2:
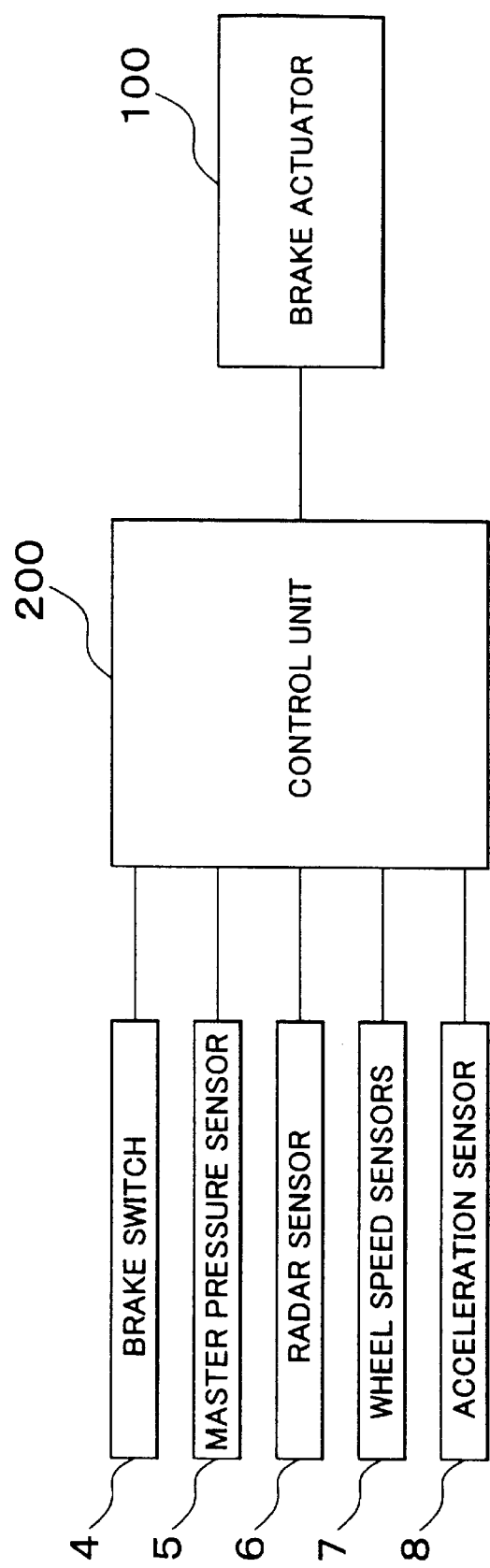
FIG. 2 is a block diagram schematically showing a control system of a brake actuator.

Thus, the control unit 200 performs operation control of the brake actuator 100 that is composed of a pump and various valve gears. As shown in FIG. 2, the control unit 200 is supplied with detection results from the brake switch 4, the master pressure sensor 5, a radar sensor 6 for detecting a vehicle-to-vehicle distance from a vehicle running in front and so on, wheel speed sensors 7 for detecting rotational speeds of the wheels, an acceleration sensor 8 for detecting a longitudinal acceleration applied to the vehicle, and so on. Additionally, the control unit 200 is supplied with detection results from a yaw rate sensor for detecting a yaw rate, an accelerator pedal sensor for detecting a depression amount of an accelerator pedal, and shift position sensor for detecting a speed-change stage of a transmission. Based on these detection results, the control unit 200 performs ABS (anti-lock brake system) control for preventing the wheels from being locked, traction control for suppressing an accelerated slip tendency, VSC (vehicle stability control) control for suppressing a spin/drift-out tendency, BA (brake assist) control for generating a greater braking force at the time of emergency braking, vehicle-to-vehicle distance control for maintaining a predetermined vehicle-to-vehicle distance from a vehicle running in front, and so on. In accordance with various control processings, the control unit 200 performs operation control of the brake actuator 100.

Figure 7:
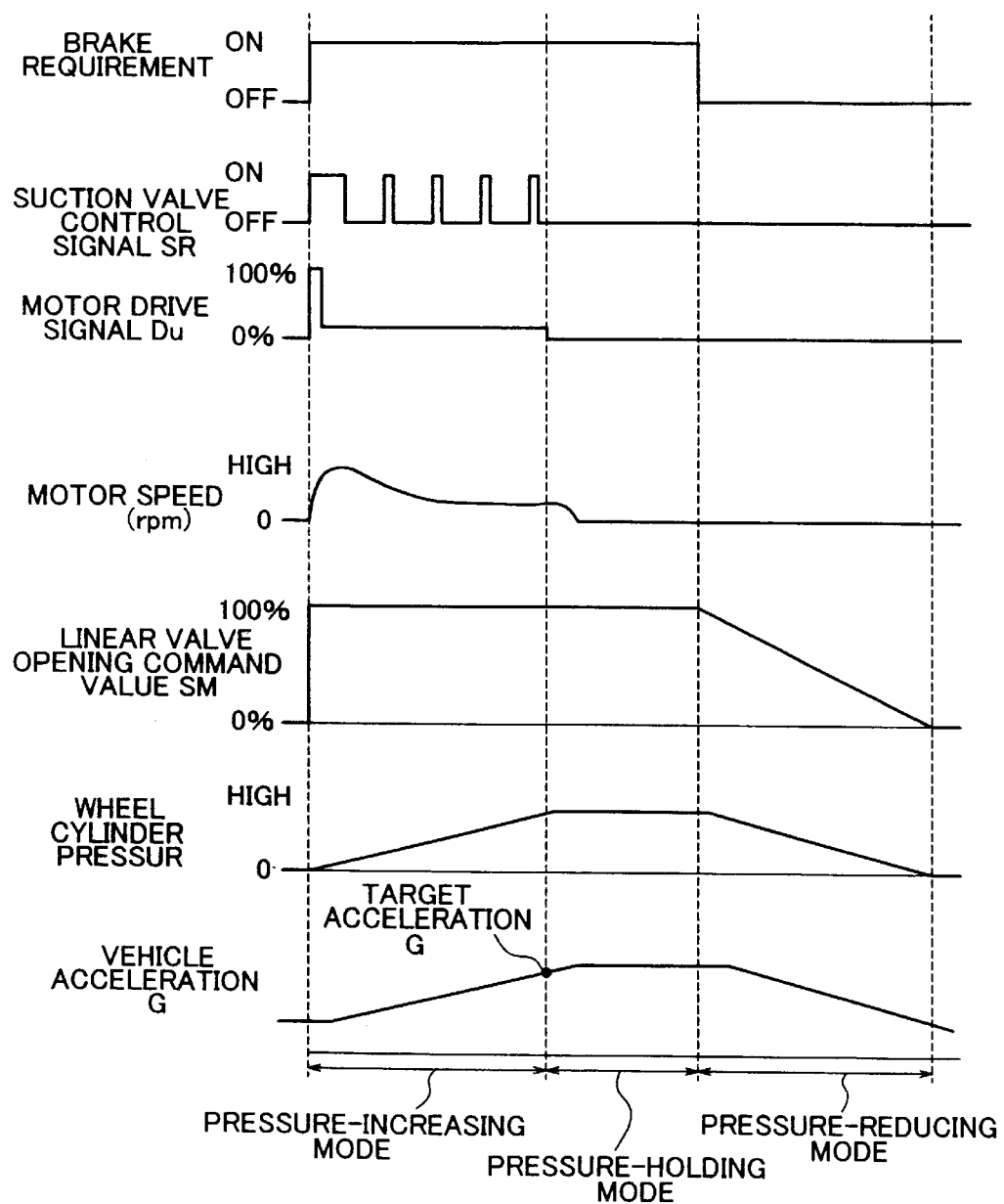
FIG. 7 illustrates how various signals, wheel cylinder pressures, and so on change with time in a pressure-increasing mode, a pressure-holding mode, and a pressure-reducing mode.

Next, vehicle-to-vehicle distance control, which is one of the control operations performed by the control unit 200, will be described using a flowchart shown in FIGS. 3A and 3B and with reference to FIGS. 1, 7. This vehicle-to-vehicle distance control is started if a predetermined condition for performance has been fulfilled, e.g., if constant-speed running control is being performed on an expressway or the like. Note that "*" in the flowchart indicates either F or R and that "**" indicates one of FR, FL, RR, and RL.

First of all, operation proceeds to step 102 where the control valves 10F, 10R are switched over to their linear valve ports to perform vehicle-to-vehicle distance control. Also, the pressure-holding valves 20FR, 20FL, 20RR, 20RL are opened, the pressure-reducing valves 60FR, 60FL, 60RR, 60RL are closed, and the suction valves 52F, 52R are closed. These valves are maintained in their respective positions until vehicle-to-vehicle distance control is terminated.

In step 104, an acceleration G that is obtained from a detection result of the acceleration sensor 8 and a vehicle-to-vehicle distance X that is obtained from a detection result of the radar sensor 6 are read.

Figure 4:
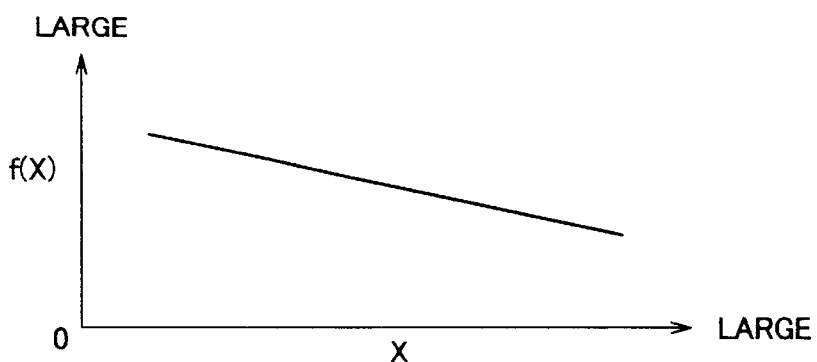
FIG. 4 is a graph illustrating a relation between vehicle-to-vehicle distance X and function f(X).
Figure 5:
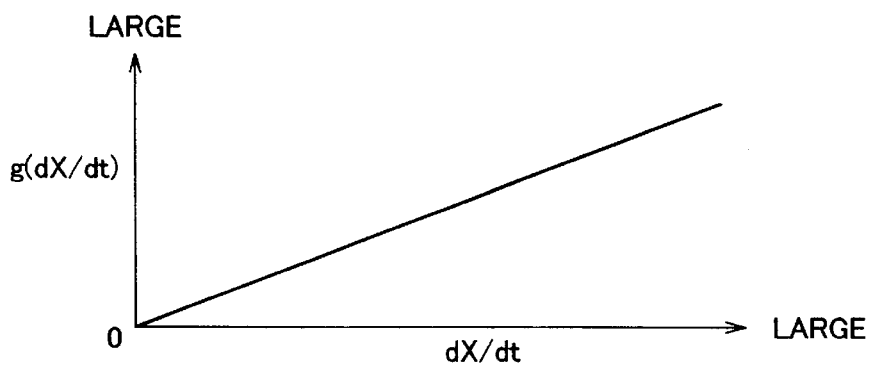
FIG. 5 is a graph illustrating a relation between temporal change in vehicle-to-vehicle distance X and function g(dX/dt).

In step 106, an evaluation function A is calculated based on the vehicle-to-vehicle distance X that has been read in step 104. The evaluation function A is defined as $A=f(X)+g(dX/dt)$. FIG. 4 shows a relation between X and $f(X)$. FIG. 5 shows a relation between $dX/dt$ and $g(dX/dt)$.

In step 108, it is determined whether or not the evaluation function A that has been calculated in step 106 assumes a value equal to or greater than a threshold As. If the result in step 108 is "NO", operation proceeds to step 122 where a braking requirement for applying brake automatically is canceled. Operation then proceeds to step 124 where it is determined whether or not a flag F1 has been set as F1=1. The flag F1 is set as F1=1 if the automatic brake requirement has been made, i.e., if a later-described pressure-increasing or pressure-holding mode has been established. At this moment, the flag F1 has been set as F1=0, and the result in step 124 is "NO". The present routine is then terminated.

On the other hand, if the result in step 108 is "YES", i.e., if the evaluation function A that has been calculated in step 106 assumes a value equal to or greater than the threshold As, operation proceeds to S110. In S110, a brake requirement for applying brake automatically is made to indicate that a condition for operation of automatic brake has been fulfilled.

Figure 6:
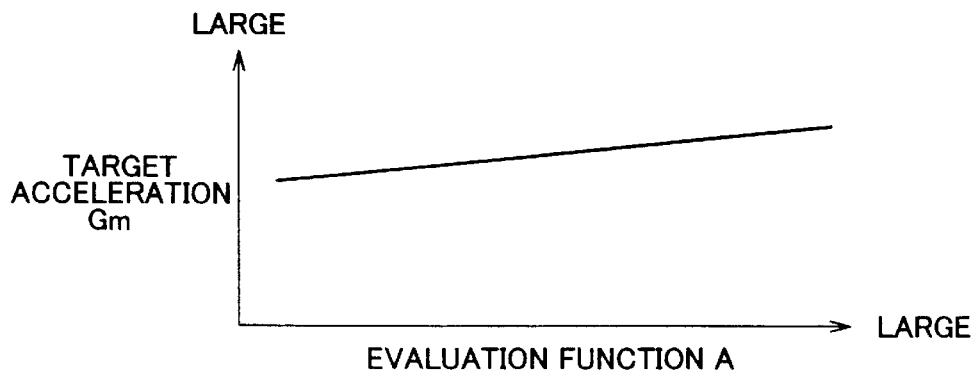
FIG. 6 is a map defining a relation between evaluation function A and target acceleration Gm.

In step 112, a target vehicle acceleration Gm corresponding to the value of the evaluation function A that has been calculated in step 106 is set based on a map shown in FIG. 6.

In step 114, the target acceleration Gm that has been set in step 112 and the acceleration G that has been read in step 104 are compared with each other. If the detected acceleration G is smaller than the target acceleration Gm ("YES" in S114), operation proceeds to step 116.

In step 116, control is performed in the pressure-increasing mode wherein hydraulic pressure supplied to the wheel cylinders 6FL, 6FR, 6RL, 6RR is increased. The suction valves 50F, 50R are open for an ON-level control signal SR, and are closed for an OFF-level control signal SR. In the pressure-increasing mode, as shown in FIG. 7, a control signal SR having a prescribed ON-OFF pattern that changes with time is outputted. In the meantime, the suction valves 50F, 50R are duty-driven. The motor M for the hydraulic pumps 30F, 30R is duty-driven. A control signal Du indicating a duty ratio also has a prescribed pattern that changes with time. As shown in FIG. 7, the duty ratio is set as 100% for a predetermined period as starting control immediately after the pressure-increasing mode has been established. After that, the duty ratio is reduced to about 20% and maintained in this state. Further, an opening command value SM for the linear valves provided in the control valves 10F, 10R is set as SM=100% (full-closed) and outputted.

Operation then proceeds to step 118 where a flag F is set as 1. The present routine is then terminated. Accordingly, as long as the pressure-increasing mode has been established, processings of outputting the control signals SR, Du and the command value SM are also continued in the routines that follow.

Thus, in the pressure-increasing mode, the suction valves 50F, 50R are duty-driven, whereby the amount of pressure oil to be sucked by the hydraulic pumps 30F, 30R is limited. The hydraulic pumps 30F, 30R are drivingly controlled at a low duty ratio. Thus, for example, even if the suction valves 50F, 50R are stuck in their full-open states due to some malfunction, the hydraulic pumps 30F, 30R are drivingly controlled at a low duty ratio. Therefore, hydraulic pressure supplied to the wheel cylinders 6FL, 6FR, 6RL, 6RR can be prevented from rising unnecessarily. Further, even if the hydraulic pumps 30F, 30R are driven at a rotational speed higher than a desired rotational speed due to a malfunction, the amount of pressure oil to be sucked by the hydraulic pumps 30F, 30R is limited by the suction valves 50F, 50R that are duty-driven. Therefore, hydraulic pressure supplied to the wheel cylinders 6FL, 6FR, 6RL, 6RR can be prevented from rising unnecessarily.

Thus, even if a malfunction has occurred in either the suction valves 50F, 50R or the hydraulic pumps 30F, 30R, hydraulic pressure supplied to the wheel cylinders 6FL, 6FR, 6RL, 6RR can be prevented from rising unnecessarily.

The hydraulic pumps 30F, 30R and the motor M are also used to perform other brake control operations for automatically controlling braking forces, such as ABS control, VSC control, and so on. During vehicle-to-vehicle distance control, braking forces are applied relatively gently. Thus, when performing vehicle-to-vehicle distance control, a fluid pressure pump that has a larger capacity than the hydraulic pumps and so on required by the control is controlled. In the case where the hydraulic pumps 30F, 30R and the motor M with a capacity larger than a required level are used, such a control method is adopted as to limit the discharge amount of pressure oil individually based on both the amount of pressure oil sucked by the pump and the rotational speed of the pump motor. Thus, an increase in hydraulic pressure resulting from the occurrence of a malfunction can be suppressed effectively.

Further, if the acceleration G has reached the target acceleration Gm while the pressure-increasing mode has been established ("NO" in S114), operation proceeds to step 120 where control makes a transition to the pressure-holding mode (constant-pressure mode) wherein hydraulic pressure supplied to the wheel cylinders 6FL, 6FR, 6RL, 6RR is held constant. In the pressure-holding mode, the opening command value SM for the linear valves (the control valves 10F, 10R) is set as SM=100% (full-closed). Further, the control signal SR is held on the OFF level to open the suction valves 50F, 50R, and the control signal Du (duty ratio) for the motor M is set as Du=0% to stop rotation of the motor M. Thus, pressure oil is encapsulated between the hydraulic pumps 30F, 30R and the wheel cylinders 6FL, 6FR, 6RL, 6RR. As a result, hydraulic pressures in the wheel cylinders 6FL, 6FR, 6RL, 6RR are held constant. Because a control method of maintaining turned-off states of the hydraulic pumps 30F, 30R is adopted in the pressure-holding mode, an unnecessary rise in hydraulic pressure resulting from the occurrence of a malfunction, which may be caused while the hydraulic pumps 30F, 30R are in operation, can be prevented.

If the result in step 108 has become "NO", i.e., if the evaluation function A calculated in step 106 has assumed a value smaller than the threshold As while hydraulic control is being performed in the pressure-increasing mode (step 116) or the pressure-holding mode (step 120), operation proceeds to step 122 where a braking requirement is canceled. Operation then proceeds to step 124 where it is determined whether or not the flag F1 has been set as F1=1. Because the flag F1 has been set as F1=1 in this circumstance, the result in step 124 is "YES". Operation then proceeds to step 126.

In step 126, it is determined whether or not a flag F2 has been set as F2=0. The flag F2 is set as F2=1 if the pressure-reducing mode has been established. Because the flag F2 has been set as F2=0, operation proceeds to step 128.

In step 128, a timer for measuring a period for the pressure-reducing mode is activated. Operation then proceeds to step 130 where the flag F2 is set as F2=1 to indicate that the processings in the pressure-reducing mode have been started.

In step 132, control is performed in the pressure-reducing mode wherein hydraulic pressure supplied to the wheel cylinders 6FL, 6FR, 6RL, 6RR is reduced. In the pressure-reducing mode, the control signal SR for the suction valves are held on the OFF level to close the suction valves 50F, 50R. Also, the control signal Du for the motor M is set as the duty ratio=0% to stop rotation of the motor M. In this state, the opening command value SM for the linear valves (the control valves 10F, 10R) is set as SM=100%−k1·T, using a count value T of the timer read in step 132 and a predetermined decremental gradient (−k1).

In step 134, it is determined whether or not the count value T of the timer has become equal to or greater than a predetermined threshold Ts. If the result in step 134 is "NO", the present routine is terminated. Because the flag F2 has been set as F2=1 in the subsequent routine, the result in step 126 is "NO". Operation then proceeds to step 132 where similar processings are repeated.

By thus repeating step 132, the opening command value SM decreases at the constant decremental gradient (−k1), whereby the linear valves (the control valves 10F, 10R) are opened gradually. Thus, the pressure oil that has been encapsulated between the hydraulic pumps 30F, 30R and the wheel cylinders 6FL, 6FR, 6RL, 6RR flows toward the master cylinder 2, and hydraulic pressure in the wheel cylinders 6FL, 6FR, 6RL, 6RR is reduced gradually. Because the hydraulic pumps 30F, 30R remain stopped during the pressure-reducing mode, an unnecessary rise in hydraulic pressure, which may be caused if operation control of the hydraulic pumps 30F, 30R has been performed, can be prevented.

If the result in step 134 is "YES", i.e., if the count value T of the timer has become equal to or greater than the predetermined threshold Ts, operation proceeds to step 136. In step 136, the flags F1, F2 are reset as 0, and the timer is reset for the next measurement. The threshold Ts has been predetermined as a period in which hydraulic pressure in the wheel cylinders 6FL, 6FR, 6RL, 6RR could be zero if the opening command value SM for the linear valves (the control valves 10F, 10R) has been reduced using the decremental gradient (−k1).

By performing control in the pressure-increasing mode, the pressure-holding mode, and the pressure-reducing mode as described above, an unnecessary rise in the hydraulic pressure supplied to the wheel cylinders 6FL, 6FR, 6RL, 6RR can be prevented even if a malfunction has occurred in the brake actuator 100.

The embodiment has been described as to brake control in the case where braking forces are applied to the four wheels. In the case of a two-wheel-drive vehicle, however, the embodiment can also be applied only to driven wheels, i.e., either front wheels or rear wheels.

Next, the second embodiment of the invention will be described.

The second embodiment handles a process of terminating brake control to give priority to braking operation by a driver in the case where the driver has performed braking operation during brake control wherein braking forces are applied automatically as described in the first embodiment. Hereinafter, this process will be described with reference to a flowchart shown in FIGS. 8A and 8B.

First, in step 202, it is determined whether or not a hydraulic pressure P of the master cylinder 2 detected by the master pressure sensor 5 is greater than a threshold Pth. If the result in step 202 is "NO", operation proceeds to step 204 where it is further determined whether or not the brake switch 4 has been turned on. If the result in step 204 is "NO", braking operation by the driver has not been detected. The present routine is then terminated immediately. Namely, the already-described brake control shown in FIGS. 3A and 3B is continued.

Figure 9:
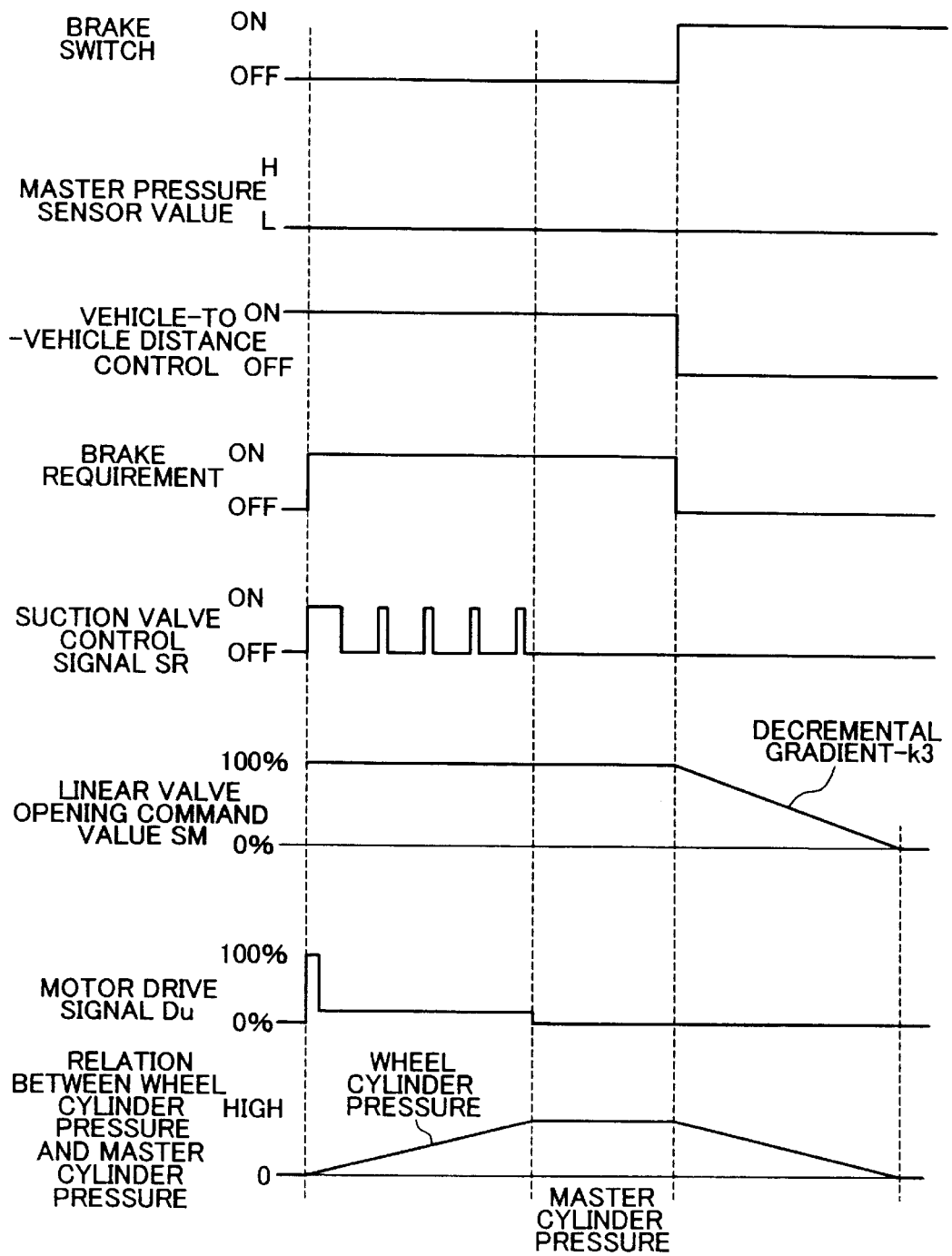

On the other hand, if the driver has applied a small depressing force to the brake pedal 1, the brake switch 4 is turned on as shown in FIG. 9. However, the hydraulic pressure P detected by the master pressure sensor 5 may not rise sufficiently. In such a case, the results in step 202 and step 204 are "NO" and "YES" respectively, and operation proceeds to step 206.

Figures 8, 8A:
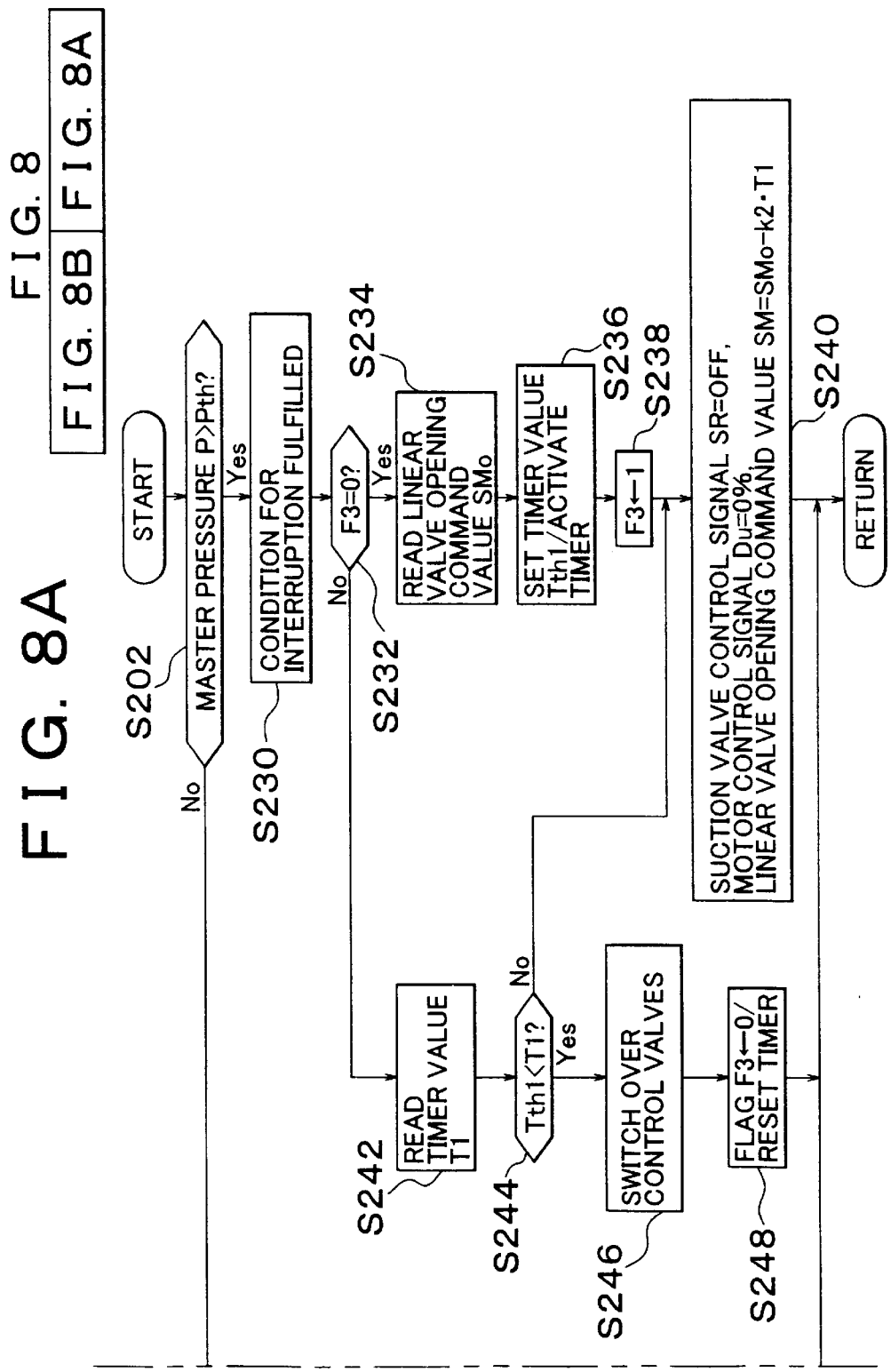

In step 206, it is determined that a condition for interruption of the brake control shown in FIGS. 3A and 3B has been fulfilled. The brake control shown in FIGS. 3A and 3B is suspended immediately, and a control process shown in FIGS. 8A and 8B is performed by priority.

In step 208, it is determined whether or not a flag F4 has been set as F4=0. Because the flag F4 has initially been set as F4=0, the result in step 208 is "YES". Operation then proceeds to step 210.

Figure 12:
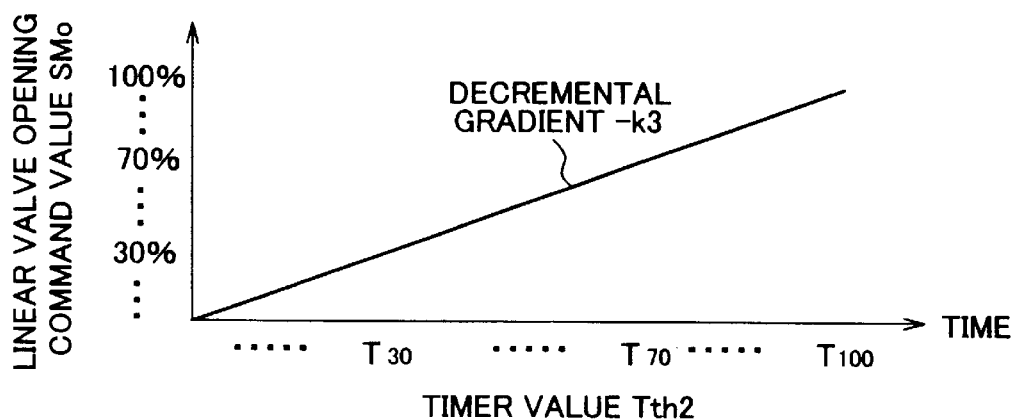
FIG. 12 is a map defining a relation between linear valve opening command value SMo and timer value Tth2 with a decremental gradient (−k3).

In step 210, an opening command value SMo for the linear valves constituting the control valves 10F, 10R is read. In step 212, a timer value Tth2 corresponding to the opening command value SMo is set based on a map shown in FIG. 12. The map shown in FIG. 12 indicates a period required for the linear valves to be displaced to their full-open positions in the case where the opening command value SMo has been reduced at a decremental gradient (−k3). For example, if the opening command value SMo=100% (full-closed) at this moment, the timer value is set as Tth2=$T_{100}$. Further, in step 212, the timer is activated so that clocking by the timer is started.

In step 214, the flag F4 is set as F4=1 to indicate that clocking by the timer has been started.

Operation then proceeds to step 216 where the same processing as in the aforementioned pressure-reducing mode is performed. Namely, the suction valve control signal SR is held on the OFF level to close the suction valves 50F, 50R. Also, the control signal Du for the motor M is set as the duty ratio=0% to stop rotation of the motor M. Furthermore, the opening command value SM for the linear valves (the control valves 10F, 10R) is set as SM=SMo−k3·T2 using the linear valve opening command value SMo at the beginning of the pressure-reducing mode, the aforementioned decremental gradient (−k3), and a count value T2 of the timer activated in step 212. The linear valve opening command value SM is then outputted.

In the case where operation has reached step 208 in the subsequent routine, since the flag F4 has been set as F4=1, the result is "NO" and operation proceeds to step 218.

In step 218, the count value T2 of the timer is read. In step 220, it is determined whether or not the count value T2 of the timer has exceeded the timer value Tth2 that has been set in step 212. If the result in step 220 is "NO", operation proceeds to the aforementioned step 216 where the same processing is repeated.

Accordingly, while the pressure in the master cylinder 2 is equal to or lower than a threshold Pth and the brake switch 4 has been turned on, the linear valves (the control valves 10F, 10R) are opened gradually due to the relatively gentle decremental gradient (−k3).

If the count value T2 of the timer has exceeded the timer value Tth2 (if the result in step 220 is "YES"), operation proceeds to step 222 where the control valves 10F, 10R are switched over to their communication ports. In step 224, the flag F4 is reset as F4=0, and the timer that is in the process of clocking is reset to be ready for the subsequent clocking.

Thus, in the circumstance where the pressure in the master cylinder 2 is equal to or lower than the threshold Pth and where the brake switch 4 has been turned on, the master cylinder 2 is in communication with the reservoir 3 that is at a pressure close to the atmospheric pressure. If the control valves 10F, 10R have been switched over to their communication ports immediately in such a circumstance, hydraulic pressures in the wheel cylinders 6FL, 6FR, 6RL, 6RR change immediately. This influence emerges as changes in deceleration and may cause a sense of incongruity to the driver. Thus, by gradually opening the linear valves (the control valves 10F, 10R) at the relatively gentle decremental gradient (−k3), the hydraulic pressures in the wheel cylinders 6FL, 6FR, 6RL, 6RR can be reduced gradually and made to coincide with the hydraulic pressure in the master cylinder 2 (see FIG. 9). A sense of incongruity resulting from changes in deceleration at the time of cancellation of brake control can be suppressed.

Referring again to FIGS. 8A and 8B, if the depression amount of the brake pedal 1 operated by the driver is great, the hydraulic pressure P in the master cylinder 2 may be increased to a pressure equal to or higher than the threshold Pth before the brake switch 4 is turned on. In such a case, the result in step 202 is "YES" and operation proceeds to step 230 where it is determined that a condition for interruption of the aforementioned brake control shown in FIGS. 3A and 3B has been fulfilled. The brake control shown in FIGS. 3A and 3B is suspended immediately, and the control process shown in FIGS. 8A and 8B is performed by priority.

In step 232, it is determined whether or not a flag F3 has been set as F3=0. Because the flag F3 has initially been set as F3=0, the result in step 232 is "YES" and operation proceeds to step 234.

Figure 13:
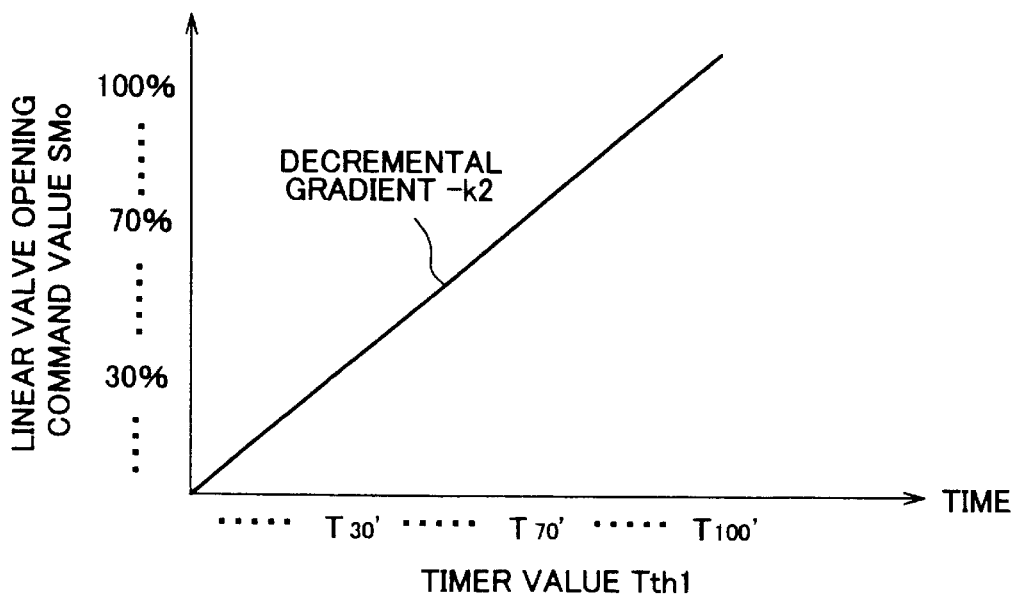
FIG. 13 is a map defining a relation between linear valve opening command value SMo and timer value Tth1 with a decremental gradient (−k2).

In step 234, an opening command value SMo for the linear valves constituting the control valves 10F, 10R is read. In step 236, a timer value Tth1 corresponding to the opening command value SMo is set based on a map shown in FIG. 13. The map shown in FIG. 13 indicates a period required for the linear valves to be displaced to their full-open positions in the case where the opening command value SMo has been reduced at a decremental gradient (−k2) (k2>k3). If the opening command value SMo=100% (full-closed), the timer value is set as Tth2=$T_{100}$ ($T_{100}$>$T_{100}$). Further, in step 236, the timer is activated so that clocking by the timer is started.

In step 238, the flag F3 is set as F3=1 to indicate that clocking by the timer has been started.

Operation then proceeds to step 240 where the same processing as in the aforementioned pressure-reducing mode is performed. Namely, the suction valve control signal SR is held on the OFF level to close the suction valves 50F, 50R, and the control signal Du for the motor M is set as duty ratio=0% to stop rotation of the motor M. Furthermore, the opening command value SM for the linear valves (the control valves 10F, 10R) is set as SM=SMo<k2·T1 using the linear valve opening command value SMo that has been read in step 234, the aforementioned decremental gradient (−k2), and the count value T1 of the timer activated in step 212. The linear valve opening command value SM is then output.

In step 232 of the subsequent routine, since the flag F3 has been set as F3=1, the result is "NO" and operation proceeds to step 242.

In step 242, the count value T1 of the timer is read. In step 244, it is determined whether or not the count value T1 of the timer has exceeded the timer value Tth1 that has been set in step 236. If the result in step 244 is "NO", operation proceeds to the aforementioned step 240 where the same processing is repeated.

Thus, if the pressure in the master cylinder 2 has become higher than the threshold Pt, the linear valves (the control valves 10F, 10R) are opened gradually due to the relatively great decremental gradient (−k2).

If the count value T1 of the timer has exceeded the timer value Tth1 ("YES" in step 244), operation proceeds to step 246 where the control valves 10F, 10R are switched over to their communication ports. In step 248, the flag F3 is reset as F3=0. In step 248, the flag F3 is reset as F3=0, and the timer that is in the process of clocking is reset to be ready for the subsequent clocking.

Thus, if the pressure in the master cylinder 2 has become higher than the threshold Pth before the brake switch 4 is turned on, the master cylinder 2 has been shut off from the reservoir 3. If the control valves 10F, 10R have been switched over to their communication ports immediately in such a circumstance, hydraulic pressures in the wheel cylinders 6FL, 6FR, 6RL, 6RR are supplied to the master cylinder 2, so that the hydraulic pressure in the master cylinder 2 rises instantaneously. The vibrations generated at this moment are conveyed to the brake pedal 1 and cause a sense of incongruity to the driver who is performing braking operation.

Figure 10:
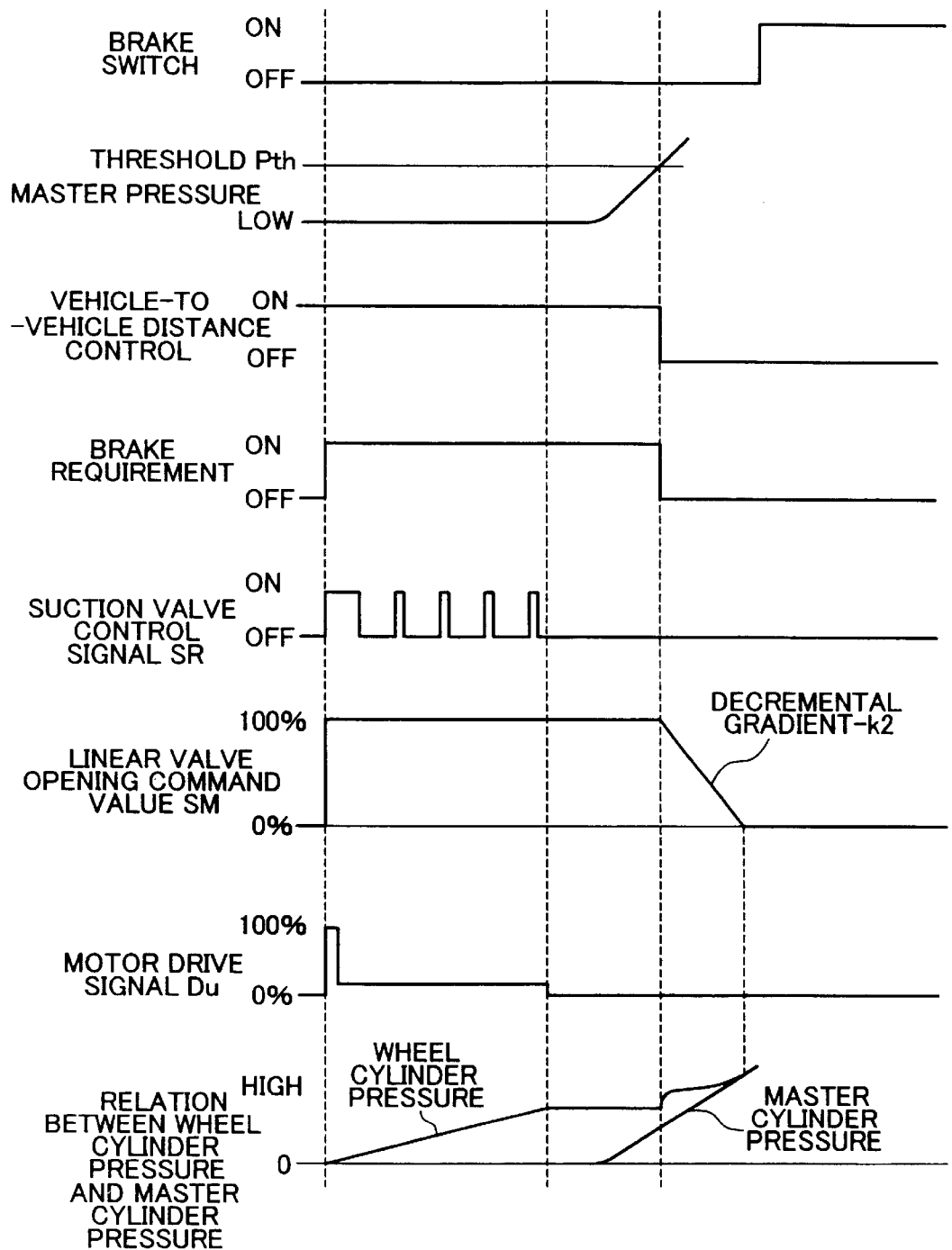
FIG. 10 illustrates how various signals, wheel cylinder pressures, a master cylinder pressure, and so on change with time in the case where termination control shown in FIGS. 8A and 8B has been performed and where the hydraulic pressure detected by the master pressure sensor has risen.

Thus, if the linear valves (the control valves 10F, 10R) are opened at such a relatively great decremental gradient (−k2), braking operation by the driver can be performed by priority as soon as the pressure in the master cylinder 2 becomes higher than the threshold value Pth, and the hydraulic pressure in the wheel cylinders 6FL, 6FR, 6RL, 6RR can be made to coincide with the hydraulic pressure in the master cylinder 2 to such an extent that the driver does not feel vibrations of the brake pedal resulting from changes in hydraulic pressure (see FIG. 10).

Figure 11:
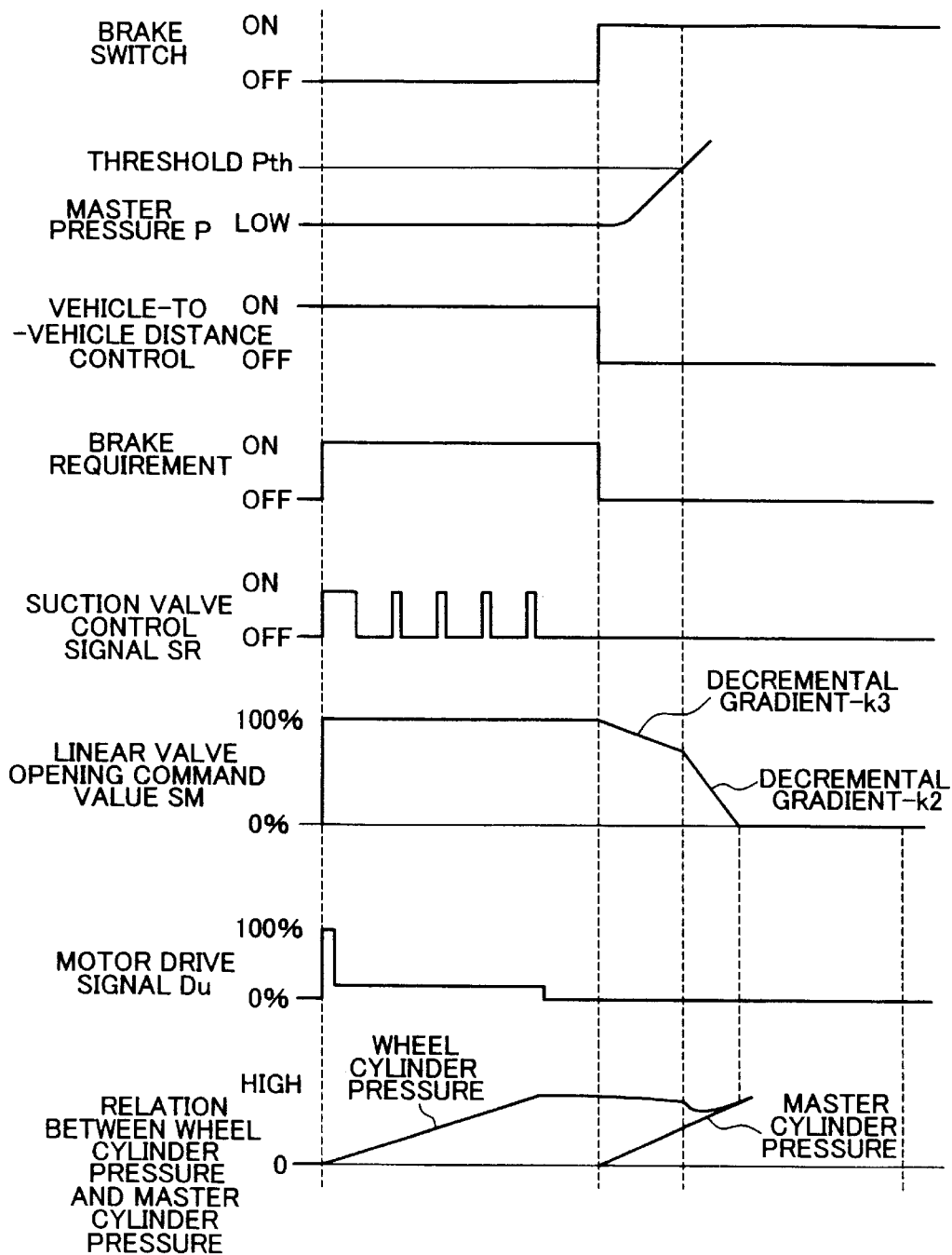
FIG. 11 illustrates how various signals, wheel cylinder pressures, a master cylinder pressure, and so on change with time in the case where termination control shown in FIGS. 8A and 8B has been performed and where the hydraulic pressure detected by the master pressure sensor has risen.

As shown in FIG. 11, the hydraulic pressure P in the master cylinder 2 may increase to a pressure equal to or higher than the threshold Pth after the brake switch 4 has been turned on. The flowchart shown in FIGS. 8A and 8B is also applied directly to this case. That is, if the brake switch 4 has been turned on (if the result in step 202 is "NO" and if the result in step 204 is "YES"), the processing in step 216 using the relatively gentle decremental gradient (−k3) is performed repeatedly. After that, if the hydraulic pressure P in the master cylinder 2 has increased to a pressure that is equal to or higher than the threshold value Pth (if the result in step 202 is "YES"), the processing in step 240 using the relatively great decremental gradient (−k2) is started.

In each of the embodiments described above, the linear valves constituting the control valves 10F, 10R are con-structed for example of valve gears having needle valves with a controllable valve opening. Instead, however, the linear valves can also be constructed of open-close valves that are opened and closed in response to ON/OFF signals. In this case, the ON/OFF operation is duty-driven, whereby the differential pressure therebetween can be controlled.

Further, although the suction valves 50F, 50R are exemplified as open-close valves that are opened and closed in response to ON/OFF signals, they may also be constructed of valve gears with a controllable valve opening.

Furthermore, although the brake switch 4 and the master pressure sensor 5 are exemplified as mechanisms for detecting braking operation by the driver, it is also possible to additionally employ a stroke sensor for detecting a stroke of the brake pedal, a sensor or a switch for detecting a depressing force, and so on.

As described above, the vehicular brake control apparatus adopts a construction wherein the pressure-increasing gradient of operating fluid is controlled by controlling both a pressure-increasing pump and a fluid pressure adjuster for adjusting a pressure of operating fluid force-fed from the pump. Thus, even if a malfunction has occurred in one of the pump and the fluid pressure adjuster, the other operates normally. Therefore, an unnecessary rise in fluid pressures in the brakes can be prevented.

Further, the vehicular brake control apparatus according to another aspect of the invention adopts a construction wherein operating fluid that has been force-fed from the pump is introduced into the communication passages between the control valves and the brakes, wherein the control valves are closed during pressure-holding control for holding fluid pressures in the brakes, and wherein the controller for stopping operation of the pump is provided. Thus, since the pump is stopped during pressure-holding control, an unnecessary rise in fluid pressure in the controller can be prevented in the meantime.

Further, the vehicular brake control apparatus according to still another aspect of the invention adopts a construction wherein operating fluid that has been force-fed from the pump is introduced into the communication passages between the control valves and the brakes, wherein the control valves are opened during pressure-reducing control for reducing fluid pressures in the brakes, and wherein the controller for stopping operation of the pump is provided. Thus, since pressure-reducing control is performed by stopping the pump and opening the control valves, an unnecessary rise in fluid pressures in the brakes can be prevented.

In the illustrated embodiment, the controller 200 is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicular brake control apparatus comprising:

brakes that apply braking forces corresponding to a pressure of a supplied operating fluid to wheels;

a pump that force-feeds the operating fluid;

a valve that adjusts the pressure of the operating fluid that is force-fed from the pump; and a controller that performs an operation control of the pump and the valve to control the pressure of the operating fluid to be supplied to the brakes when the controller determines that the braking forces are to be applied to the vehicle, wherein the controller controls a pressure-increasing gradient of a fluid pressure by controlling both the pump and the valve during a pressure-increasing control for increasing the pressure in the brakes, and wherein the controller controls the pressure-increasing gradient of the fluid pressure by performing a duty-driving operation of the pump with a duty ratio varying with time and a duty-driving operation of the opening and closing of the valve during the pressure-increasing control.

2. The control apparatus according to claim 1, wherein:

the valve is connected to a suction port of the pump and adjusts the pressure of the operating fluid to be force-fed from the pump by controlling an amount of the operating fluid to be supplied to the pump.

3. The control apparatus according to claim 1, wherein:

the controller determines that braking forces are to be applied to the vehicle, if a vehicle-to-vehicle distance from another vehicle running in front satisfies a predetermined condition.

4. A vehicular brake control apparatus comprising:

brakes that apply braking forces corresponding to a pressure of a supplied operating fluid to wheels;

a pump that force-feeds the operating fluid;

a valve that adjusts the pressure of the operating fluid that is force-fed from the pump; and a controller that performs an operation control of the pump and the valve to control the pressure of the operating fluid to be supplied to the brakes when the controller determines that the braking forces are to be applied to the vehicle, wherein the controller controls a pressure-increasing gradient of a fluid pressure by controlling both the pump and the valve during a pressure-increasing control for increasing the pressure in the brakes, and wherein the controller selects one of a pressure-increasing control mode, a pressure-reducing control mode, and a pressure-holding mode in accordance with a vehicle-to-vehicle distance from another vehicle running in front and an acceleration of the vehicle and controls the fluid pressure in the brakes in the selected mode.

5. A vehicular brake control apparatus comprising:

brakes that apply braking forces corresponding to a pressure of a supplied operating fluid to wheels;

a pump that force-feeds the operating fluid;

a valve that adjusts the pressure of the operating fluid that is force-fed from the pump;

a controller that performs an operation control of the pump and the valve to control the pressure of the operating fluid to be supplied to the brakes when the controller determines that the braking forces are to be applied to the vehicle, wherein the controller controls a pressure-increasing gradient of a fluid pressure by controlling both the pump and the valve during a pressure-increasing control for increasing the pressure in the brakes;

a master cylinder that changes the pressure of the operating fluid in accordance with a brake operating force;

control valves provided in communication passages between the master cylinder and the brakes to control the opening state of the communication passages; and an introduction passage that introduces the operating fluid that has been force-fed from the pump into the communication passages between the control valves and the brakes;

wherein the controller suspends the pressure-increasing gradient control of the fluid pressure, opens the control valves, and stops the operation of the pump if the braking operation has been indicated by the driver.

6. The control apparatus according to claim 5, wherein:

the controller changes an opening speed of the control valves in accordance with a hydraulic pressure in the master cylinder if the braking operation has been indicated by a driver.

7. A vehicular brake control apparatus comprising:

a master cylinder that changes a pressure of an operating fluid in accordance with a brake operating force;

brakes that apply the brake operating force corresponding to the pressure of the operating fluid supplied from the master cylinder to wheels;

a pump that force-feeds the operating fluid;

control valves provided in communication passages between the master cylinder and the brakes to control an opening state of the communication passages;

an introduction passage that introduces the operating fluid that has been force-fed from the pump to the communication passages between the control valves and the brakes; and a controller that performs an operation control of the pump and the control valves to control the pressure of the operating fluid to be supplied to the brakes when the controller determines that the braking forces are to be applied to the vehicle, wherein the controller closes the control valves and stops the operation of the pump during a pressure-holding control for holding the operating fluid pressure in the brakes.

8. The control apparatus according to claim 7, wherein:

the controller opens the control valves and maintains a stopped state of operation of the pump if the braking operation has been indicated by a driver.

9. A vehicular brake control apparatus comprising:
a master cylinder that changes a pressure of an operating fluid in accordance with a brake operating force;
brakes that apply the brake operating force corresponding to the pressure of the operating fluid supplied from the master cylinder to wheels;
a pump that force-feeds the operating fluid;
control valves provided in communication passages between the master cylinder and the brakes to control an opening state of the communication passages;
an introduction passage that introduces the operating fluid that has been force-fed from the pump into the communication passages between the control valves and the brakes; and
a controller that performs an operation control of the pump and the control valves to control the pressure of the operating fluid to be supplied to the brakes when the controller determines that the braking forces are to be applied to the vehicle,
wherein the controller opens the control valves and stops the operation of the pump during a pressure-reducing control for reducing the operating fluid pressure in the brakes.

10. The control apparatus according to claim 9, wherein:
the controller changes an opening speed of the control valves in accordance with a hydraulic pressure in the master cylinder if the braking operation has been indicated by a driver.

11. The control method according to claim 10, wherein:
an opening speed of the control valves is changed in accordance with a hydraulic pressure in the master cylinder if the braking operation has been indicated by a driver.

12. A brake control method for a vehicle having brakes that apply braking forces corresponding to a pressure of a supplied operating fluid to wheels, a pump that force-feeds the operating fluid, and a valve that adjusts the pressure of operating fluid force-fed from the pump, comprising the steps of:
determining whether or not the braking forces are to be applied to the vehicle;
performing an operation control of the pump and the valve to control a pressure of operating fluid to be supplied to the brakes when a controller determines that the braking forces are to be applied to the vehicle; and
controlling a pressure-increasing gradient of the fluid pressure with a duty ratio varying with time by controlling both the pump and the valve during a pressure-increasing control for increasing the operating fluid pressure in the brakes.

13. The control method according to claim 12, wherein:
the valve is connected to a suction port of the pump and the pressure of the operating fluid to be force-fed from the pump is adjusted by controlling an amount of the operating fluid to be supplied to the pump.

14. The control method according to claim 12, wherein:
the determining step determines that braking forces are to be applied to the vehicle, if a vehicle-to-vehicle distance from another vehicle running in front satisfies a predetermined condition.

15. A brake control method for a vehicle having brakes that apply braking forces corresponding to a pressure of a supplied operating fluid to wheels, a pump that force-feeds the operating fluid, and a valve that adjusts the pressure of operating fluid force-fed from the pump, comprising the steps of:
determining whether or not the braking forces are to be applied to the vehicle;
performing an operation control of the pump and the valve to control a pressure of operating fluid to be supplied to the brakes when a controller determines that the braking forces are to be applied to the vehicle; and
controlling a pressure-increasing gradient of the fluid pressure by controlling both the pump and the valve during a pressure-increasing control for increasing the operating fluid pressure in the brakes;
wherein the pressure-increasing gradient of the fluid pressure is controlled by performing a duty-driving operation of the pump and a duty-driving operation of the opening and closing of the valve during the pressure-increasing control.

16. A brake control method for a vehicle having brakes that apply braking forces corresponding to a pressure of a supplied operating fluid to wheels, a pump that force-feeds the operating fluid, and a valve that adjusts the pressure of operating fluid force-fed from the pump, comprising the steps of:
determining whether or not the braking forces are to be applied to the vehicle;
performing an operation control of the pump and the valve to control a pressure of operating fluid to be supplied to the brakes when a controller determines that the braking forces are to be applied to the vehicle;
controlling a pressure-increasing gradient of the fluid pressure by controlling both the pump and the valve during a pressure-increasing control for increasing the operating fluid pressure in the brakes;
selecting one of a pressure-increasing control mode, a pressure-reducing control mode, and a pressure-holding mode in accordance with a vehicle-to-vehicle distance from another vehicle running in front and an acceleration of the vehicle; and
controlling the fluid pressure in the brakes in the selected mode.

17. A brake control method for a vehicle having brakes that apply braking forces corresponding to a pressure of a supplied operating fluid to wheels, a pump that force-feeds the operating fluid, and a valve that adjusts the pressure of operating fluid force-fed from the pump, comprising the steps of:
determining whether or not the braking forces are to be applied to the vehicle;
performing an operation control of the pump and the valve to control a pressure of operating fluid to be supplied to the brakes when a controller determines that the braking forces are to be applied to the vehicle;
controlling a pressure-increasing gradient of the fluid pressure by controlling both the pump and the valve during a pressure-increasing control for increasing the operating fluid pressure in the brakes; and
providing a master cylinder that changes the pressure of the operating fluid in accordance with a brake operating force, control valves provided in communication passages between the master cylinder and the brakes to control the opening state of the communication passages, and an introduction passage that introduces the operating fluid that has been force-fed from the pump into the communication passages between the control valves and the brakes;
wherein the pressure-increasing gradient control of the fluid pressure is suspended, the control valves are opened, and the operation of the pump is stopped if the braking operation has been indicated by the driver.

18. The control apparatus according to claim 17, wherein:

an opening speed of the control valves is changed in accordance with a hydraulic pressure in the master cylinder if the braking operation has been indicated by a driver.

19. A brake control method for a vehicle having a master cylinder that changes a pressure of an operating fluid in accordance with a brake operating force, brakes that apply the brake operating force corresponding to the pressure of the operating fluid supplied from the master cylinder to wheels, a pump that force-feeds the operating fluid, control valves provided in communication passages between the master cylinder and the brakes to control an opening state of the communication passages, and an introduction passage that introduces the operating fluid force-fed from the pump into the communication passages between the control valves and the brakes, comprising the steps of:

determining whether or not the braking forces are to be applied to the vehicle;

performing an operation control of the pump and the valve to control the pressure of the operating fluid to be supplied to the brakes when the controller determines that the braking forces are to be applied to the vehicle; and closing the control valves and stopping the operation of the pump during a pressure-holding control for holding the operating fluid pressure in the brakes.

20. The control method according to claim 19, wherein:

the control valves is opened and maintained a stopped state of operation of the pump if the braking operation has been indicated by a driver.

21. A brake control method for a vehicle having a master cylinder that changes a pressure of an operating fluid in accordance with a brake operating force, brakes that apply the brake operating force corresponding to the pressure of the operating fluid supplied from the master cylinder to wheels, a pump that force-feeds the operating fluid, control valves provided in communication passages between the master cylinder and the brakes to control an operating state of the communication passages, and an introduction passage that introduces the operating fluid force-fed from the pump into the communication passages between the control valves and the brakes, comprising the steps of:

determining whether or not the braking forces are to be applied to the vehicle;

performing an operation control of the pump and the control valves to control the pressure of the operating fluid to be supplied to the brakes when the controller determines that the braking forces are to be applied to the vehicle; and controlling an opening speed of the control valves and a stopping operation of the pump during a pressure-reducing control for reducing the operating fluid pressure in the brakes.

* * * * *